United States Patent
Daroux et al.

[11] Patent Number: 6,145,280
[45] Date of Patent: Nov. 14, 2000

[54] FLEXIBLE PACKAGING FOR POLYMER ELECTROLYTIC CELL AND METHOD OF FORMING SAME

[75] Inventors: Mark L. Daroux, Cleveland Heights; David A. Glover, Parma; Richard F. Riczinger, Painesville; Allen D. Mackell, Huntsburg Township, all of Ohio

[73] Assignee: NTK Powerdex, Inc., Eastlake, Ohio

[21] Appl. No.: 09/271,956

[22] Filed: Mar. 18, 1999

Related U.S. Application Data

[60] Provisional application No. 60/078,419, Mar. 18, 1998.

[51] Int. Cl.$^7$ ................................................. B65B 31/00
[52] U.S. Cl. ................................. 53/433; 53/397; 53/452; 53/481; 53/482; 29/623.2
[58] Field of Search ........................... 53/434, 433, 452, 53/459, 594, 397, 479, 481, 482; 29/730, 623.2, 623.3, 623.4

[56] References Cited

U.S. PATENT DOCUMENTS

| | | |
|---|---|---|
| 2,257,823 | 10/1941 | Stokes . |
| 2,600,216 | 6/1952 | Denison ........................... 99/179 |
| 3,094,083 | 6/1963 | Weeks ............................. 112/10 |
| 3,900,341 | 8/1975 | Shoichiro et al. ............... 29/623.2 |
| 4,106,262 | 8/1978 | Aterianus . |
| 4,351,106 | 9/1982 | Brady ................................ 29/730 |
| 4,418,464 | 12/1983 | Digiacomo et al. ............... 29/730 |
| 4,511,416 | 4/1985 | Karpiloff ............................ 53/459 |
| 4,538,396 | 9/1985 | Nakamura ......................... 53/412 |
| 4,603,537 | 8/1986 | Pace .................................. 53/415 |
| 4,850,526 | 7/1989 | Naef et al. ........................ 229/87 |
| 4,949,846 | 8/1990 | Lakey ............................... 206/484 |
| 5,131,760 | 7/1992 | Farmer ............................. 383/210 |
| 5,282,349 | 2/1994 | Siegel .............................. 53/433 |
| 5,358,539 | 10/1994 | Dawson et al. ................. 29/623.2 |
| 5,442,897 | 8/1995 | Hinzmann et al. .............. 53/449 |

Primary Examiner—Linda Johnson
Attorney, Agent, or Firm—Mark Kusner

[57] ABSTRACT

A method of packaging a rectangular electrolytic battery, comprising the steps of forming a sleeve from a flat, rectangular sheet of a laminate material by overlapping and joining opposite edges of the sheet; inserting a rectangular battery into one end of the sleeve, the battery having two electronic contacting leads extending from one side thereof and the battery being positioned within the sleeve wherein a portion of the leads is within the sleeve and a portion of the leads is outside said sleeve; joining the ends of the sleeve to form a seal along each end thereof, hermetically sealing the interior of the sleeve, one end of the sleeve forming a seal about the leads and the other end of the sleeve sealed adjacent the battery.

10 Claims, 8 Drawing Sheets

_FLEXIBLE PACKAGING FOR POLYMER ELECTROLYTIC CELL AND METHOD OF FORMING SAME_

This application claims the benefit of U.S. Provisional Application Ser. No. 60/078,419 filed on Mar. 18, 1998.

FIELD OF THE INVENTION

The present invention relates generally to electrochemical devices using liquid or polymer electrolytes or requiring hermetic packaging, and more particularly, to packaging and enclosures for encasing and hermetically sealing an electrolytic cell or battery.

BACKGROUND OF THE INVENTION

Improvements in microelectronics have increased the demand for electrolytic cells and batteries that can be directly incorporated into electronic devices so as to produce a portable, finished package. As the improvements in microelectronics reduce the size of the electronic device, the space allotted to a power supply within such device has likewise decreased. It is therefore important to maximize the power-per-unit space that a battery cell can provide. One way to improve power-per-unit space is to reduce the size of the packaging or enclosure containing the electrolytic cell.

Traditionally, batteries, particularly small batteries, are packaged in metal cans (e.g., cylindrical batteries and button cells) or within molded plastic cases (e.g., SLI batteries). These types of enclosures and packages contain the active components of the battery, insulate them from the environment and provide overall mechanical strength. Such enclosures are dimensioned to be fairly rigid to withstand significant internal pressures. In this respect, in some types of batteries, internal gas buildup may occur resulting in relatively high internal pressures. These pressures must be contained within the enclosure to avoid explosion or violent venting. Both plastic and metal enclosures can provide the necessary structural strength to withstand most internal pressures, and do so in a volume efficient manner. Metal containers are most "volume efficient" in that relatively thin-walled metal containers can withstand significant pressures yet the volume of the container itself presents only a small portion of a battery's overall volume.

While metal and molded plastic containers are sturdy and volume efficient, they are somewhat shape restrictive. Typically, metal and molded plastic containers are most suitable and cost effective when traditional cylindrical shapes (especially for metal enclosures) or rectangular shapes are required. However, when a specific application or product requires a battery having an unusual shape, such as an extremely thin battery or a non-planar or non-prismatic battery, the assembly of a battery in an unusually shaped metal or plastic enclosure becomes more difficult.

For extremely thin or unusually shaped batteries, flexible packaging has found advantageous application. Flexible packaging can provide hermetic containment of the battery, and in addition, has several advantages over traditional rigid metal or plastic packaging. Foremost, flexible materials are lighter and they can conform more easily to the shape of the battery structure, thus providing easier and more cost effective manufacturing. Further, a flexible laminate package enables more efficient use of the space available within a device, in that such a package can assume a variety of shapes allowing the battery to be designed to accommodate the space restriction within a device. Still further, flexible packaging is less susceptible to a violent venting or catastrophic failure as compared to rigid metal or plastic containers. In this respect, flexible packaging ruptures at a fraction of the pressure of rigid metal or plastic enclosures.

The advantages of flexible laminate packaging are particularly valuable for small, high-energy batteries. In general, the smaller the battery becomes in any one dimension, the greater is the contribution of the packaging to the overall weight and volume of the battery. With smaller batteries, the metal cans or molded plastic cases previously described decrease the measure of the "energy density" of such batteries. (As used herein, the term "energy density" (in watt-hours/liter) shall refer to a measurement of the deliverable energy contained within a particular volume of battery.) For these small, high-energy batteries, foil laminate packaging finds advantageous application by providing weight savings over metal cans and plastic cases. However, if the final package is not carefully configured, any potential weight and shape advantage of the flexible packaging may be lost, or the overall volume may even increase due to the packaging configuration.

The advantages of a flexible laminate packaging may also be lost when packaging a non-aqueous battery, such as a high-energy lithium ion battery. If long storage and operating life are to be obtained for such batteries, the packaging or enclosure must provide and maintain a hermetic barrier that will prevent electrolytic solvents from escaping from the battery and water vapor and oxygen from penetrating into the battery. Such a barrier is typically provided by a layer of metal foil within the flexible laminate. In order to maintain the hermetic barrier, it is also important that the laminate be formed into a bag or package without significant stretching or deformation of the laminate that may tear or rupture the metal foil layer.

FIGS. 1–5 show a conventional package configuration formed of a flexible laminate for an electrolytic battery. Typically, the packaging is formed from a flexible laminate having a polymer layer for toughness, a metal layer to form a hermetic barrier and an interior adhesive layer. The packaging is typically formed by placing a rectangular electrolytic cell onto one side of a sheet of the flexible laminate. The cell is positioned such that a portion of each of the leads extending from the cell is positioned on the laminate, and a portion of the leads extends beyond the edge of the laminate. The other half of the laminate sheet is then folded over onto the battery to overlay onto the other side of the sheet, with the interior adhesive layer in contact with itself along three peripheral edges where the laminate extends beyond the cell. In this respect, the laminate sheet is dimensioned such that when folded over, it extends beyond three peripheral edges of the cell. Heat and pressure are applied to these three edges to form a seal about the periphery of the cell.

As can be seen in FIG. 1, the sealed regions of the laminate that extend about the three sides of the cell occupy a significant amount of space. If the finished battery is intended to fit into a rectangular cavity within an electronic device, these sealed edges must be folded onto the cell body. These sealed regions may be folded onto the cell body as illustrated in FIGS. 2 and 3, but the resulting edge and corner projections (as best seen in FIG. 5) includes a buildup wherein seven layers of the laminate are overlaid onto each other. This built-up region of overlapping layers of the laminate reduces the volume efficiency, i.e., the "energy density" of the battery.

Another problem associated with flexible packaging is forming a hermetic seal around the battery leads that extend through the packaging. Typically, such leads (conventionally referred to as "feedthroughs") are formed of thin strips of metal foil, such as copper or aluminum, and have a thickness approximately equal to that of the adhesive layer on the flexible laminate. Because the heat and pressure that can be applied to the laminate when forming the battery package (i.e., sealing the edges) must be limited so as not to tear the laminate during the sealing process, creating a complete and permanent seal about the feedthroughs is a major problem in flexible laminate packaging. FIG. 10 pictorially illustrates how voids may form along the edges of a feedthrough as a result of the limited heat and pressure that can be applied to the flexible laminate during a conventional sealing process. Such voids may allow air or moisture to penetrate the package or may allow electrolyte to escape from the package, both of which basically destroy the effectiveness of the battery. Excessive heat and pressure, on the other hand, can create the problem shown in FIG. 11, wherein the metal foil layer of the laminate is pressed near or into contact with the feedthrough, as the softened adhesive material is forced laterally by the pressure of a forming platen. Contact between the feedthrough and the metal foil can "short circuit" the battery. In this respect, both leads are typically pressed simultaneously by the same forming platen, and if the metal foil is pressed into contact with one feedthrough, it will generally also be pressed into contact with the other feedthrough. Even if the increased pressure does not create a short circuit (or tear the laminate), there is no certainty that the voids along the lateral edges of the feedthroughs will be closed.

The present invention overcomes these and other problems and provides an improved method of forming a hermetic package for a battery from a flexible laminate material.

SUMMARY OF THE INVENTION

In accordance with the present invention, there is provided a method of packaging a battery, comprising the steps of forming a sleeve from a flat, rectangular sheet of a flexible laminate material by overlapping opposite edges of the sheet, the laminate comprised of a layer of a polymeric material, a layer of metal foil, and outer layers of an adhesive-like, thermoplastic polymer material; applying sufficient heat to the overlapped edges to melt the adhesive-like polymer layers and form a continuous hermetically sealed axial seam extending the length of the sleeve; inserting a battery into one end of the sleeve, the battery having two electronic leads extending from one side thereof and the battery being positioned within the sleeve wherein a portion of the leads is within the sleeve and a portion of the leads is outside the sleeve; applying sufficient heat and pressure to the ends of the sleeve to melt the adhesive-like polymer layers to form sealed seams along the ends of the sleeve hermetically sealing the interior of the sleeve, one end of the sleeve forming a first sealed lateral seam about the electrical leads and the other end of the sleeve forming a second sealed lateral seam defining a cavity within the sleeve adjacent the battery; evacuating the interior of the sleeve; applying sufficient heat to the sleeve at a location immediately adjacent to the end of the battery to melt the adhesive layer to form a hermetically sealed third lateral seam along the end of the battery; and severing the portion of the sleeve beyond the third lateral seam seal.

In accordance with another aspect of the present invention, there is provided a method of packaging a rectangular electrolyte battery, comprising the steps of forming a sleeve from a sheet of a laminate material by overlapping and joining opposite edges of the sheet to form a continuous seal extending along the length of the sleeve; inserting a battery into one end of the sleeve, the battery having two electronic leads extending from one side thereof, the battery being positioned within the sleeve wherein a portion of the leads is within the sleeve and a portion of said leads is outside the sleeve; and joining the ends of the sleeve to form a seal along the ends hermetically sealing the interior of the sleeve, one end of the sleeve forming a seal about the electrical leads and the other end of the sleeve forming a seal adjacent the battery.

It is an object of the present invention to provide a package for small, electrochemical devices, wherein said package is formed of a flexible laminate material.

Another object of the present invention is to provide a method of packaging a prismatic, electrolytic battery with a flexible laminate material.

Another object of the present invention is to provide a method of packaging batteries as described above which maximizes the energy density of the battery.

Another object of the present invention is to provide a method of packaging batteries as described above that reduces the packaging space necessary for hermetically sealing the electrolytic cell.

A still further object of the present invention is to provide a method of packaging as described above that lends itself to forming battery shapes not easily attainable by metal cans.

A still further object of the present invention is to provide a method as described above that finds particular application in forming non-planar batteries.

A still further object of the present invention is to provide a method as described above that finds particular application in forming very thin batteries.

Another object of the present invention is to provide an improved method of forming a seal between feedthroughs and flexible laminate packaging of an electrolytic battery.

These and other objects will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
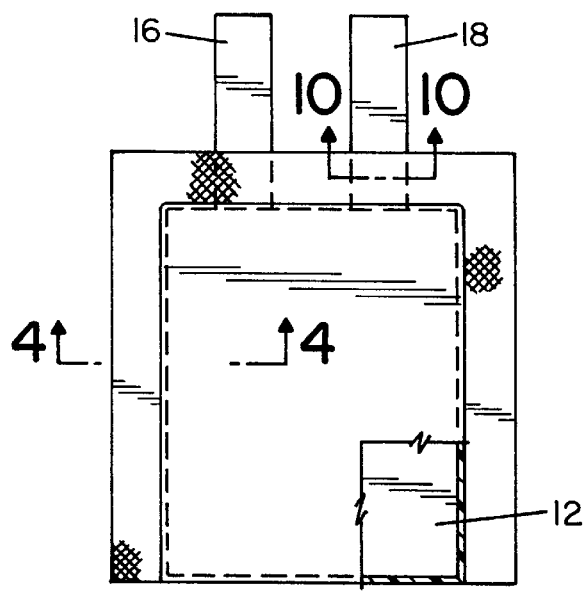
FIGS. 1–3 show a conventional method of forming a battery package from a laminate material.
Figure 2:
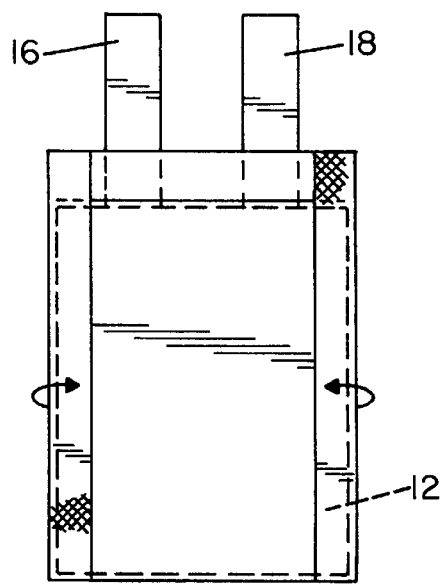
Figure 3:
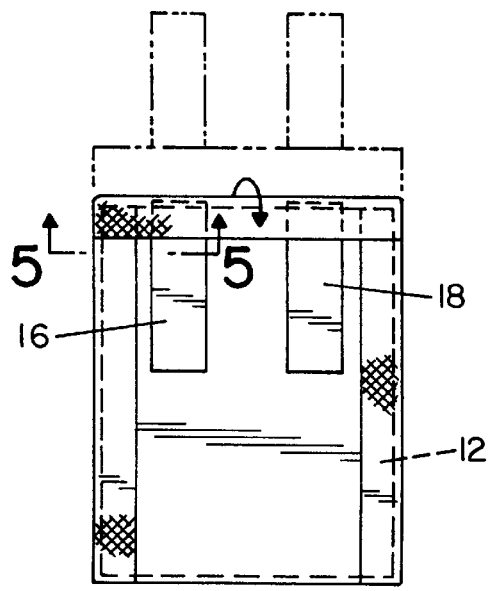
Figure 4:
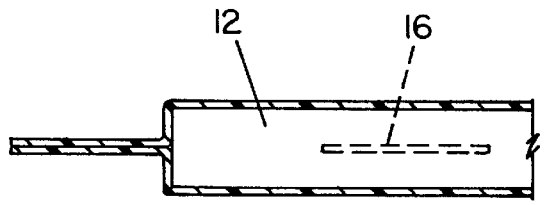
FIG. 4 is an enlarged sectional view taken along line 4—4 of FIG. 1.
Figure 5:
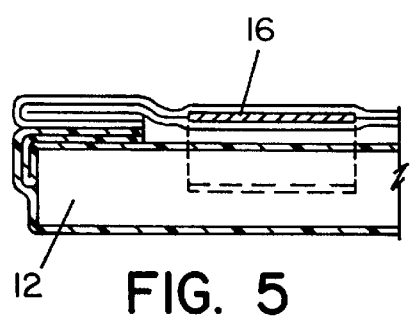
FIG. 5 is an enlarged sectional view taken along line 5—5 of FIG. 3 showing the layered buildup of laminate material in a corner of a battery package formed as shown in FIGS. 1–3.
Figure 6:
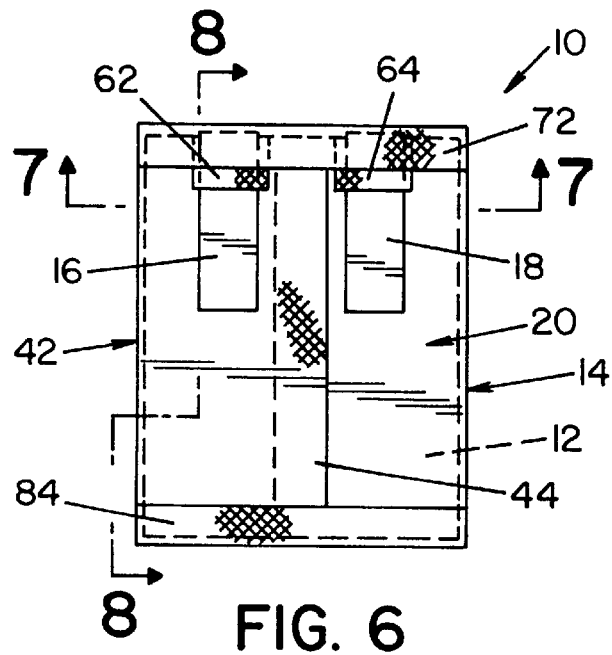
FIG. 6 is a top plan view of a battery package illustrating a preferred embodiment of the present invention.

Referring now to the drawings wherein the showings are for the purpose of illustrating preferred embodiments of the invention only, and not for the purpose of limiting same, FIG. 6 illustrates a battery 10 packaged in accordance with the present invention. In the embodiment shown, a planar, solid polymer electrolytic battery 10 is illustrated. It will, of course, be appreciated from a further reading of the specification that the present invention may be applied to other types and shapes of battery cells, and is not limited to planar solid polymer electrolytic cells. Battery 10 is generally comprised of a polymer electrolytic cell 12 contained within a package 14. Cell 12 (best illustrated in FIG. 12) is generally flat and rectangular in shape and includes two spaced-apart leads 16 and 18 extending from one side thereof. Cell 12 may be of a type disclosed in U.S. Pat. No. 5,183,715 to North, the disclosure of which is expressly incorporated herein by reference. Leads 16 and 18 that extend from cell 12 are generally rectangular strips formed of a conductive material, such as copper or aluminum, as is conventionally known in the art. (FIGS. 1–5 show a similar conventional polymer electrolytic cell 12 packaged in accordance with a conventional process.) FIGS. 6–19 illustrate a packaged cell and a method of packaging the cell in accordance with the present invention.

Outer package 14 is preferably formed in accordance with one aspect of the present invention. In the embodiment shown, package 14 that encases electrolytic cell 12 is formed from a sheet 20 of a laminate material, best seen in FIGS. 9 and 10. Broadly stated, laminate 20 is preferably multi-layered and includes at least one layer of a thermoplastic, sealant material 32, one layer of a metal foil 26 and one layer of a polymer material 34. The thermoplastic, sealant layer 32 is provided as an adhesive layer, which when heat and pressure are applied, it may bond onto itself or onto one of the other layers of laminate 20. The metal foil layer 26 is provided as a barrier layer to form a hermetic barrier within the package 14. The polymer layer 34 is provided to impart mechanical properties to package 14, namely tensile strength, penetration resistance and stiffness.

The thickness of laminate 20 is preferably kept as thin as possible so that laminate 20 maintains sufficient flexibility to be wrapped about cell 12, as will hereinafter be described. At the same time, laminate 20 and its individual layers preferably have sufficient thicknesses to impart to laminate 20 the mechanical properties necessary to provide the toughness and hermeticity required of package 14. In this respect, the overall thickness of laminate 20 is preferably less than 6.0 mils, and more preferably, in the range of about 4.0 to about 5.0 mils.

Figure 12:
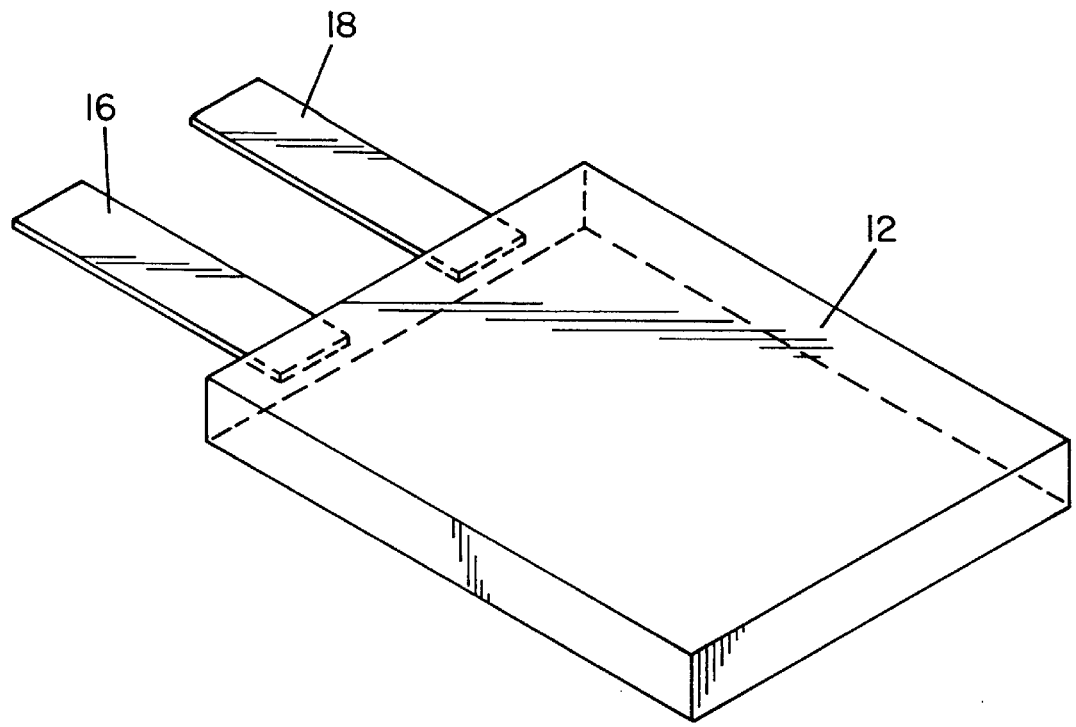
FIG. 12 is an enlarged perspective view of a typical electrolytic battery pack to be enclosed within a package according to the present invention.
Figure 13:
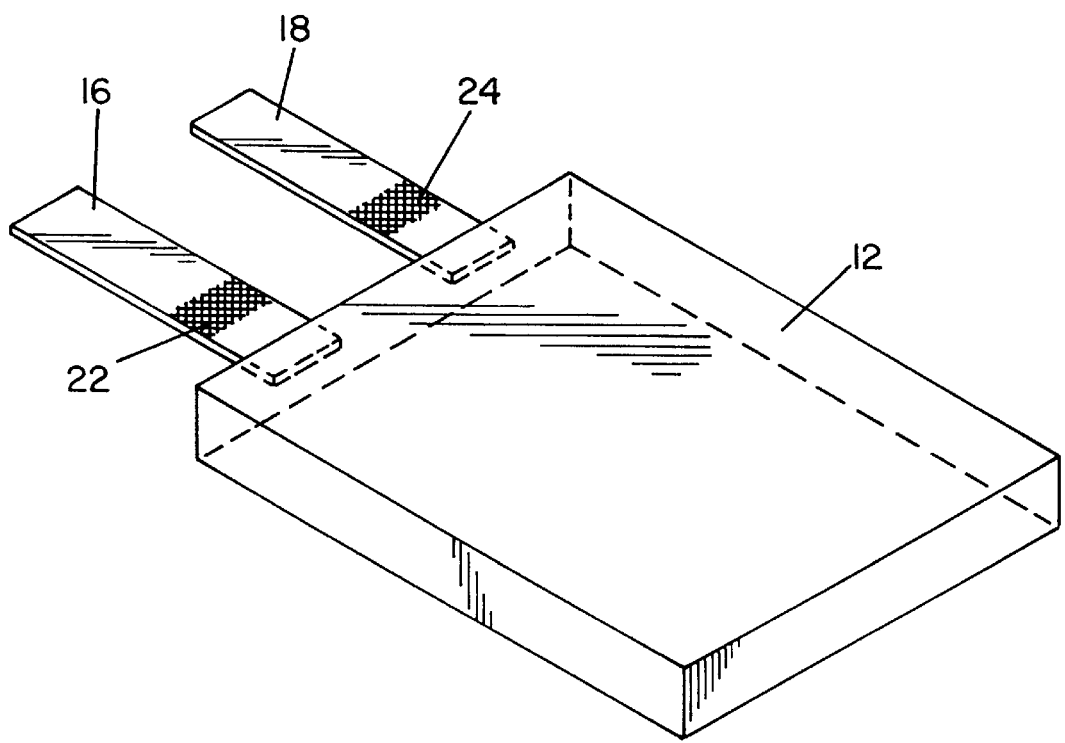
FIG. 13 is a perspective view of the battery pack shown in FIG. 12, showing a portion of the leads processed in accordance with one aspect of the present invention.
Figure 16:
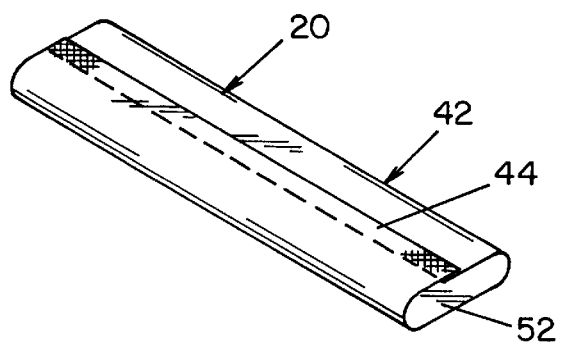
FIG. 16 is a perspective view of a tubular sleeve formed from the laminate shown in FIG. 9.

Referring now more specifically to package 14 of battery 10, package 14 is best described with reference to the process for forming the same. Referring now to FIG. 16, a sheet of laminate 20 is formed into a tubular sleeve 42 of predetermined length. Sleeve 42 is formed by overlapping opposite edges of a rectangular sheet of laminate 20 and sealing such overlapping edges by applying heat and pressure thereto. Sleeve 42 is preferably formed by overlapping the opposite edges of laminate 20 on an anvil (not shown) and applying a heated die (not shown) to the outer exposed edge of laminate 20. Sufficient heat and pressure are applied by the heated die to soften adhesive-like polymer layers 32, 34 of laminate 20 causing them to fuse to each other when cooled. Sleeve 42 defines an inner cavity 52 that is dimensioned to receive power cell 12. As shown in FIG. 12, in the embodiment shown, cell 12 has a generally flat, rectangular configuration having electrodes or leads 16 and 18 extending from one side thereof.

In accordance with one aspect of the present invention, prior to insertion of cell 12 into sleeve 42, leads 16, 18 are treated and bands 62, 64 of a non-conductive, thermosetting polymer sealing material are applied around leads 16, 18. Bands 62, 64 are provided as a means to improve the sealing of package 14 around leads 16, 18. As illustrated in FIG. 12, bands 62, 64 are basically formed from strips of the thermosetting polymer material and are folded over each lead 16, 18. Bands 62, 64 are positioned near the area where leads 16, 18 join cell 12, i.e., where leads 16, 18 will be embedded within a seam of package 14.

Prior to applying bands 62, 64, leads 16, 18 undergo a treatment designed to enhance adhesion, wetting, chemical and electrochemical stability, hermeticity, corrosion resistance and strength of the final seal. A preferred treatment includes the following steps: a) a cleaning process to clean the metal surface of leads 16, 18 by a degreasing process, chemical and/or electrochemical etching or polishing or mechanical abrasion; b) a surface enhancement process to increase the roughness and/or surface area of leads 16, 18 by mechanical abrasion or roughening, etching, electrodeposition or electroless deposition; c) an adhesion-promoting process by applying a priming layer or layers to the metal surface (e.g., adhesion promoter for polymer thermoplastic adhesion); and d) a surface protection process by applying an inhibitor or a protective layer or layers to the surface of leads 16, 18, such as oxidation and corrosion inhibitors by electroplating, conversion coatings, anodizing, electroless deposition, vapor deposition, dipping, spraying or the like. More preferably, for leads 16, 18 formed of aluminum or copper, the treatment includes the steps of: a) cleaning the metal surfaces by degreasing (acetone or alcohol bath with agitation); and b) mechanically roughening the surface of metal leads 16, 18 by ultrasonic knurling. As best seen in FIG. 12, portions of leads 16, 18, designated 22, 24 in the drawings, are roughened by knurling. Portions 22, 24 are positioned on leads 16, 18 in the vicinity where leads 16, 18 will extend through package 14.

Figure 14:
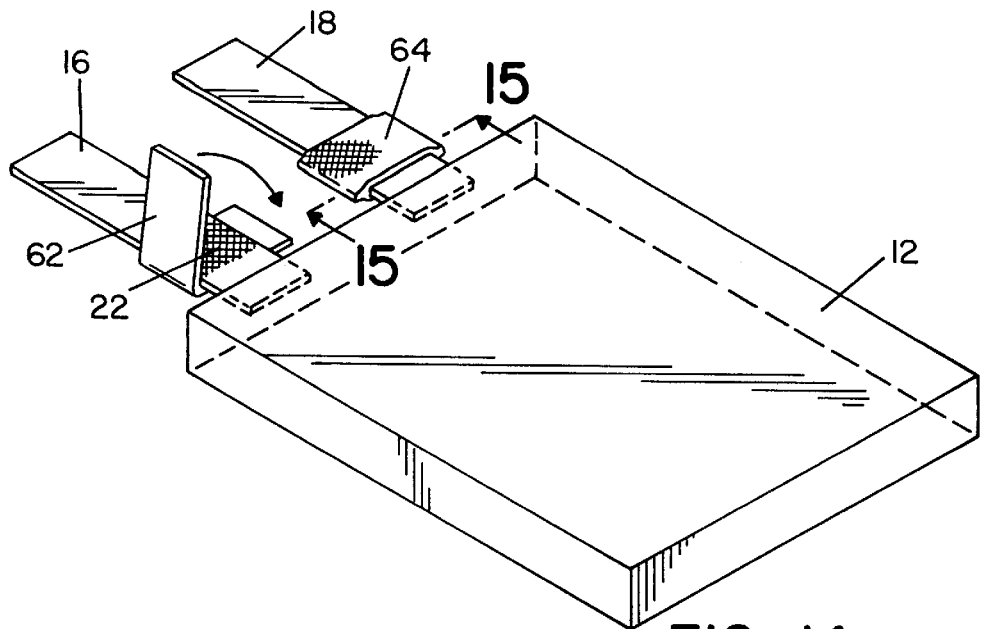
FIG. 14 is a perspective view of the electrolytic battery pack shown in FIGS. 12 and 13 showing bands of sealing material applied to the leads thereof.
Figure 15:
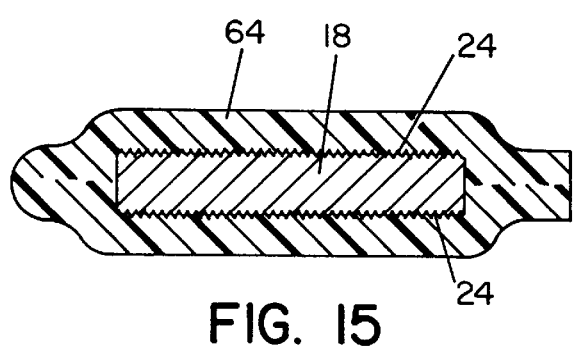
FIG. 15 is an enlarged sectional view taken along lines 15—15 of FIG. 14, schematically illustrating the complete seal formed about the feedthrough.

Following the foregoing treatment, bands 62, 64 are applied to the treated area of leads 16, 18. Bands 62, 64 are preferably formed of a thermoplastic polymer compatible with the polymer material forming the inner adhesive layer of laminate 20. In accordance with a preferred embodiment of the present invention, bands 62, 64 are preferably formed from 1–2 mils thick SURLYN® (SURLYN® is a registered trademark of DuPont). Bands 62, 64 are positioned on leads 16, 18 to cover portions 22, 24 thereof. As illustrated in FIG. 14, band 62, 64 are basically strips of the thermoplastic polymer, and are folded over leads 16, 18 to cover portions 22, 24. Localized heat and sufficient pressure are applied to bands 62, 64 and leads 16, 18 to melt bands 62, 64 to form a continuous hermetic seal about leads 16, 18, as illustrated in FIG. 15. The forming dies or platens used to press the softened polymer around feedthroughs 16, 18 may be flat, but are preferably formed to force the softened polymer into engagement with the lateral edges of the feedthroughs. Whereas shaped or contoured dies may stretch or tear the metal foil layer of flexible laminate 20, since only a polymer layer is being applied to the feedthroughs 16, 18 during this "banding" process, contoured dies may be used to insure the softened polymer completely covers the entire periphery of feedthroughs 15, 16. Further, the heat and pressure that may be applied to bands 62, 64 are greater than may be applied to laminate 20 without the risk of damaging laminate 20. This higher pressure and heat insures a better seal about leads 16, 18.

In addition to coating leads 16, 18 to insure a complete, hermetic seal between lead 16, 18 and the polymer material, another object of bands 62, 64 is to provide a localized, thick area of polymer material above and below leads 16, 18. This localized thick area of polymer material is created when flexible laminate 20 is placed over bands 62, 64. With bands 62, 64 surrounding leads 16, 18, the metal foil layer of flexible laminate 20 is separated from leads 16, 18 by a layer of sealant material on flexible laminate 20 and by the polymer layer forming bands 62, 64. Thus, while it is desirous to minimize the thickness of flexible laminate 20 forming packaging 14, maximizing the thickness of polymer material between the metal foil layer and leads 16, 18, reduces the likelihood of "short circuiting" leads 16, 18 when forming a sealed seam about leads 16, 18.

Still further, the polymer-to-polymer contact between bands 62, 64 and the polymer layer of flexible laminate 20 allows easier and better bonding with less heat and pressure than is required to bond a polymer layer to metal leads 16, 18. Thus, the localized thick area of polymer formed by bands 62, 64 and the polymer adhesive layer of laminate 20 facilitates better sealing around leads 16, 18 and reduces the likelihood of short circuits.

While in the embodiment shown bands 62, 64 are formed from strips of polymer material applied to leads 16, 18 by a pressing process, it will be appreciated by those skilled in the art that bands 62, 64 may be applied by other means. By way of example and not limitation, bands 62, 64 may be formed by a coating process wherein softened polymer material is sprayed, poured or dragged onto leads 16, 18. In the context of the present invention, it is only important that the polymer material forming bands 62, 64 completely "coat" leads 16, 18 about regions 22, 24 to form a seal thereabout, and that bands 62, 64 have sufficient thickness to prevent the metal layer of flexible laminate from contacting leads 16, 18 during the forming of package 14.

Figure 17:
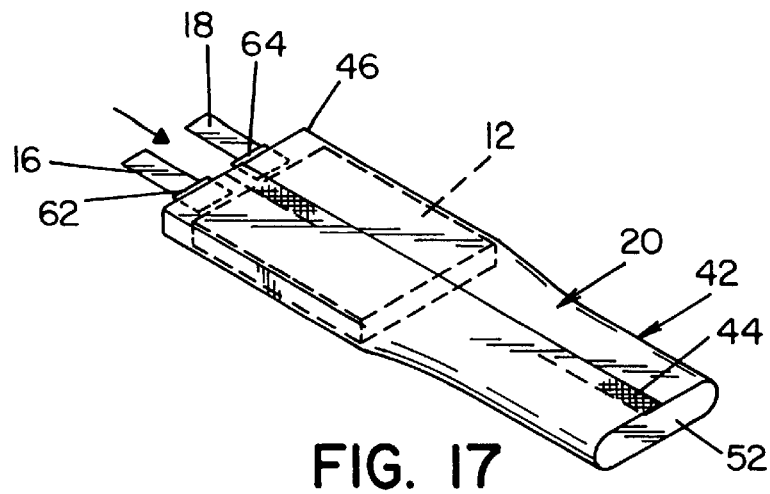
FIG. 17 is a perspective view showing the electrolytic cell shown in FIGS. 12–14 being inserted into the sleeve shown in FIG. 16.

With bands 62, 64 applied to leads 16, 18, cell 12 is inserted into first end 46 of sleeve 42, as illustrated in FIG. 17. Cell 12 is positioned within sleeve 42 such that portions of leads 16, 18 are within sleeve 42 and portions of leads 16, 18 extend beyond first end 46 of sleeve 42. More specifically, cell 12 is preferably positioned such that the opposed edges of first end 46 of sleeve 42 are positioned across bands 62, 64 on leads 16, 18. A sealed, lateral seam 72 is formed along first end 46 of sleeve 42 by pressing the opposed edges of sleeve 42 into engagement with each other and by applying sufficient heat and pressure to soften and fuse adhesive-like polymer layer 32 thereon. A hermetic seal is formed along first end 46 of sleeve 42 upon cooling of adhesive-like polymer layer 32. Sleeve 42 is dimensioned to any slightly larger than cell 12 so as to fit snugly therearound.

According to one aspect of the present invention, prior to sealing first end 46 of sleeve 42, the lateral sides of sleeve 42 are forced inwardly (much like folding the sides of wrapping paper when wrapping a package) to form a generally triangular gusset 54 in sleeve 42 prior to applying heat thereto. By forming gussets 54 prior to sealing the ends of sleeve 42, ends 46, 48 of sleeve 42 do not flair outwardly so as to form bulges at the side of package 14.

In accordance with another aspect of the present invention, the aforementioned bands 62, 64 on leads 16, 18 are provided for two reasons. One reason is that they insure better seals about leads 16, 18 by acting as an intermediate material that better adheres to both metal leads 16, 18 and the adhesive-like polymer material of laminate 20. In this respect, greater pressure may be applied to leads 16, 18 when applying bands 62, 64 thereto than could be applied when heating and sealing ends 46, 48 of sleeve 42. As will be appreciated, excessive heat and pressure applied to laminate 20 may cause it to tear or split, thereby destroying the hermetic barrier around cell 12. Greater pressure may be applied to leads 16, 18 in that such components are merely metal strips. The greater pressure that may be applied to leads 16, 18 insures that the softened polymer material forming bands 62, 64 wet the surfaces of metal leads 16, 18 about their entire periphery. This insures that a polymer-to-metal contact and bond is established about the entire periphery of metal leads 16, 18. In addition, greater heat may be applied in a more localized and more concentrated manner to bands 62, 64 and leads 16, 18. Such heating and pressure are less likely to affect cell 12 than if the same heat and pressure are applied along first end 46 of sleeve 42 to form the seam adjacent cell 12. In such a situation, the heat and pressure would be applied near cell 12 in a less controllable fashion. Still further, when first end 46 is being sealed, the inner surface of sleeve 42 in the vicinity of leads 16, 18 contacts the polymer material forming bands 62, 64.

Since bands 62, 64 are themselves formed of a thermoplastic material, the two engaging surfaces are meltable surfaces, and thus insure a better seal in the region of leads 16, 18, than if adhesive-like polymer layer 32 of the laminate 20 were engaging the metal surface of leads 16, 18 directly, under the same limited heat and pressure.

A second reason for bands 62, 64 is to provide an insulation barrier to insure that a short circuit does not occur between leads 16, 18 in the event that one or both of metal layer 26 is exposed at first end 46 of sleeve 42. In this respect, should metal layer 26 of laminate 20 extend beyond the other layers, polymer bands 62, 64 prevent a short circuit connection being formed between leads 16, 18.

Figure 18:
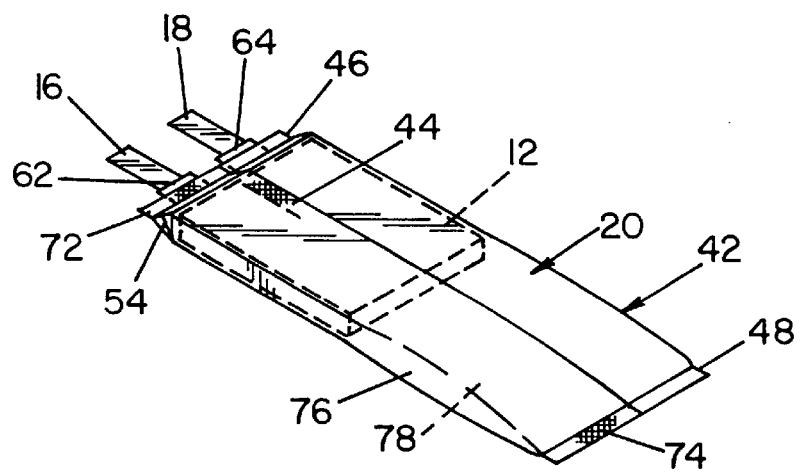
FIG. 18 shows the sleeve shown in FIG. 16 with the electrolytic cell therein after the ends of the sleeve have been sealed.
Figure 19:
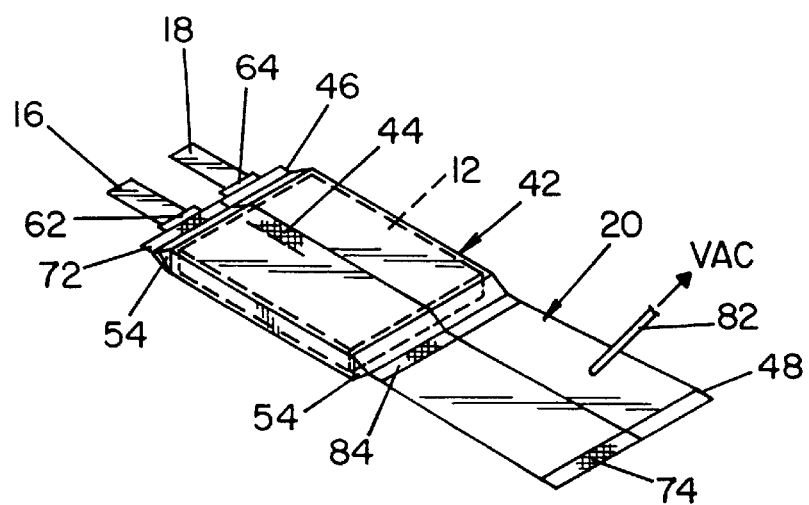
FIG. 19 schematically illustrates the evacuation of the inner cavity defined by the sleeve.

Referring now to FIG. 18, a lateral seam 74 is formed along second end 48 of sleeve 42. As illustrated in the drawings, sleeve 42 is dimensioned (i.e., has a length) such that it extends well beyond cell 12 and defines a pouch or bag 76 to one side of cell 12. Pouch 76 defines an internal cavity or chamber 78. Chamber 78 is provided as a space to collect gas or vapors that may build up during the manufacturing assembly of some types of batteries, such as, by way of example and not limitation, lithium cells. To vent such gas or vapors, pouch 76 is pierced to expose interior cavity 78 to a vacuum. FIG. 19 shows by means of a schematic representation, a method for evacuating cavity 78. In FIG. 19, a tube 82 connectable to a vacuum source is inserted through sleeve 42 into cavity 78 to evacuate the same. Sleeve 42 may also be opened within a vacuum chamber (not shown) to evacuate cavity 78. As will be appreciated, cell 12 will be exposed to the vacuum for only a short period of time, the time being sufficient to remove gas and vapors from cavity, but not so long as to cause solution or liquid material within cell 12 to be evacuated therefrom.

Figure 20:
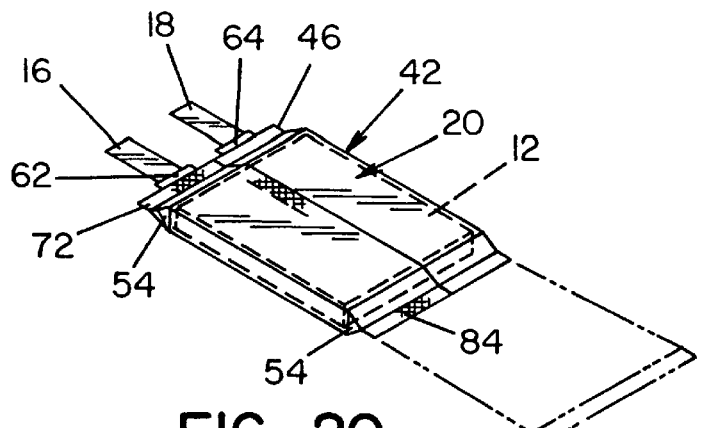
FIG. 20 shows the battery package shown in FIG. 19 having a seal formed immediately adjacent the end of the electrolytic cell, showing in phantom a portion of the battery package that is severed therefrom.

Following evacuation of cavity 78, a third sealed seam 84 is then formed immediately adjacent the end of cell 12, as best seen in FIG. 19, by applying sufficient heat to melt adhesive-like polymer layer 32 of laminate 20. As indicated above, gussets 54 are preferably formed along the sides of package 14 to prevent an outward extending bulge being formed at the corners of battery 10. The portion of sleeve 42 extending beyond seam 84 is removed (i.e., cut away) and discarded. The resultant battery 10 is illustrated in FIG. 20, wherein the discarded portion of sleeve 42 is shown in phantom.

Figure 7:
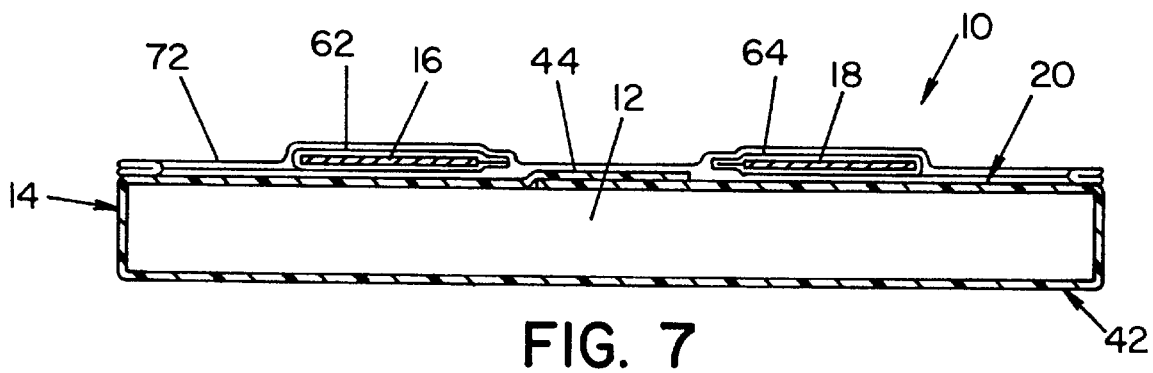
FIG. 7 is an enlarged sectional view taken along line 7—7 of FIG. 6.
Figure 8:
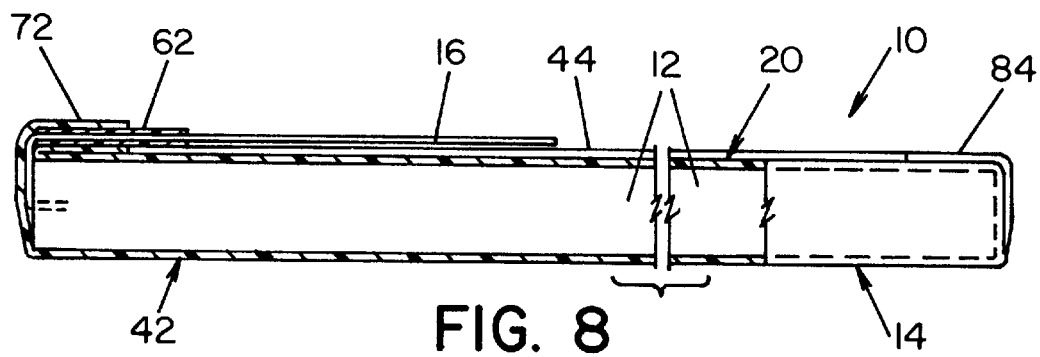
FIG. 8 is an enlarged cross-sectional view taken along the line 8—8 of FIG. 6.
Figure 9:
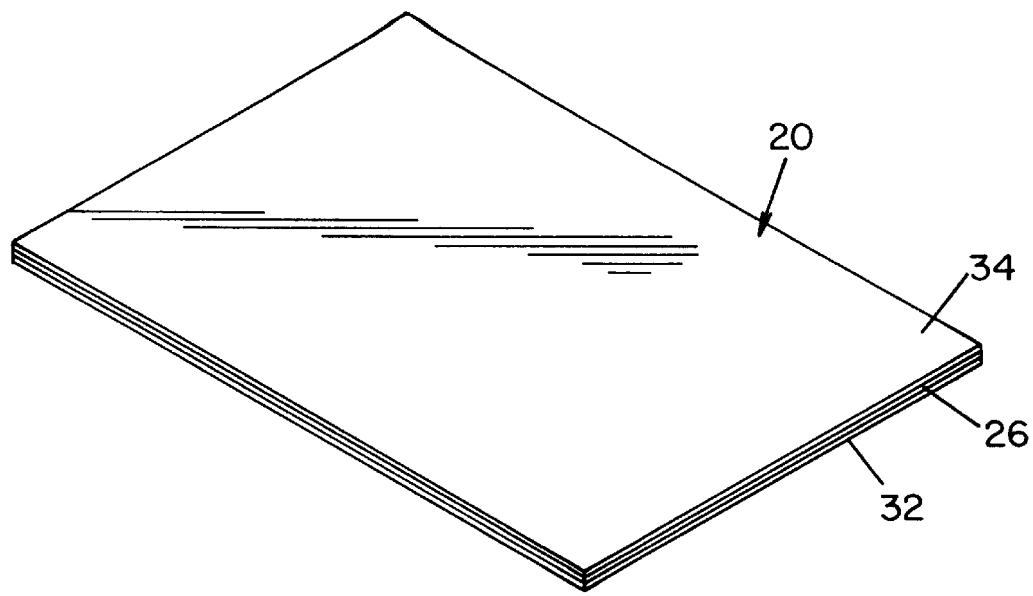
FIG. 9 is a perspective view of a rectangular sheet of flexible laminate material to be used in packaging batteries in accordance with the present invention.
Figure 10:
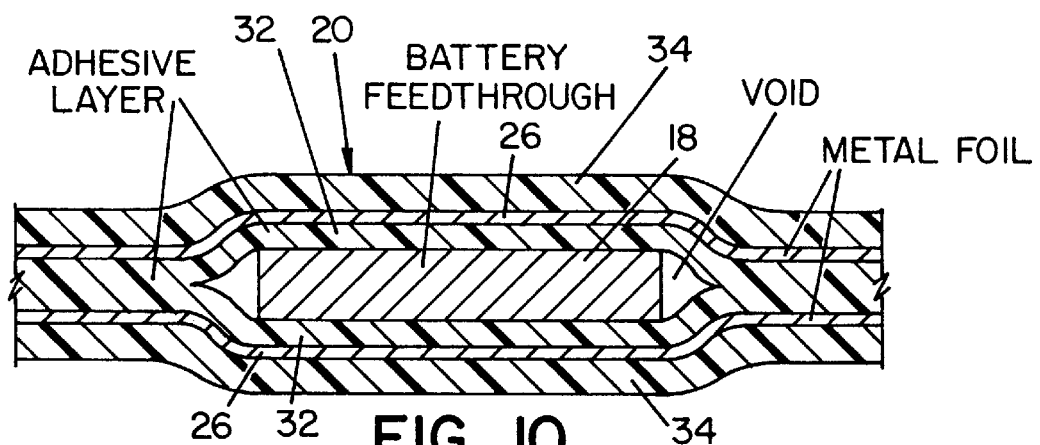
FIG. 10 is an enlarged sectional view taken along lines 10—10 of FIG. 1, illustrating how voids may exist along the edges of a feedthrough (i.e., lead) as a result of conventional sealing methods.
Figure 11:
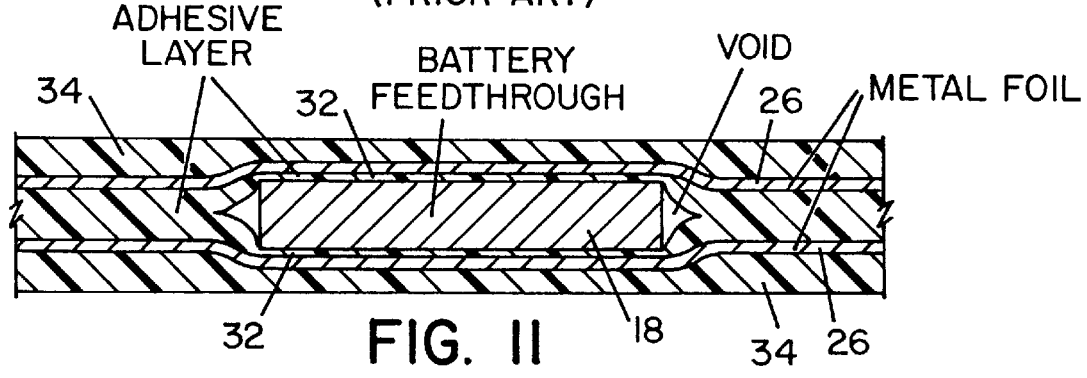
FIG. 11 is a sectional view of the feedthrough shown in FIG. 10 showing how overcompression of the laminate can force a metal foil layer into near contact with the feedthrough.
Figure 21:
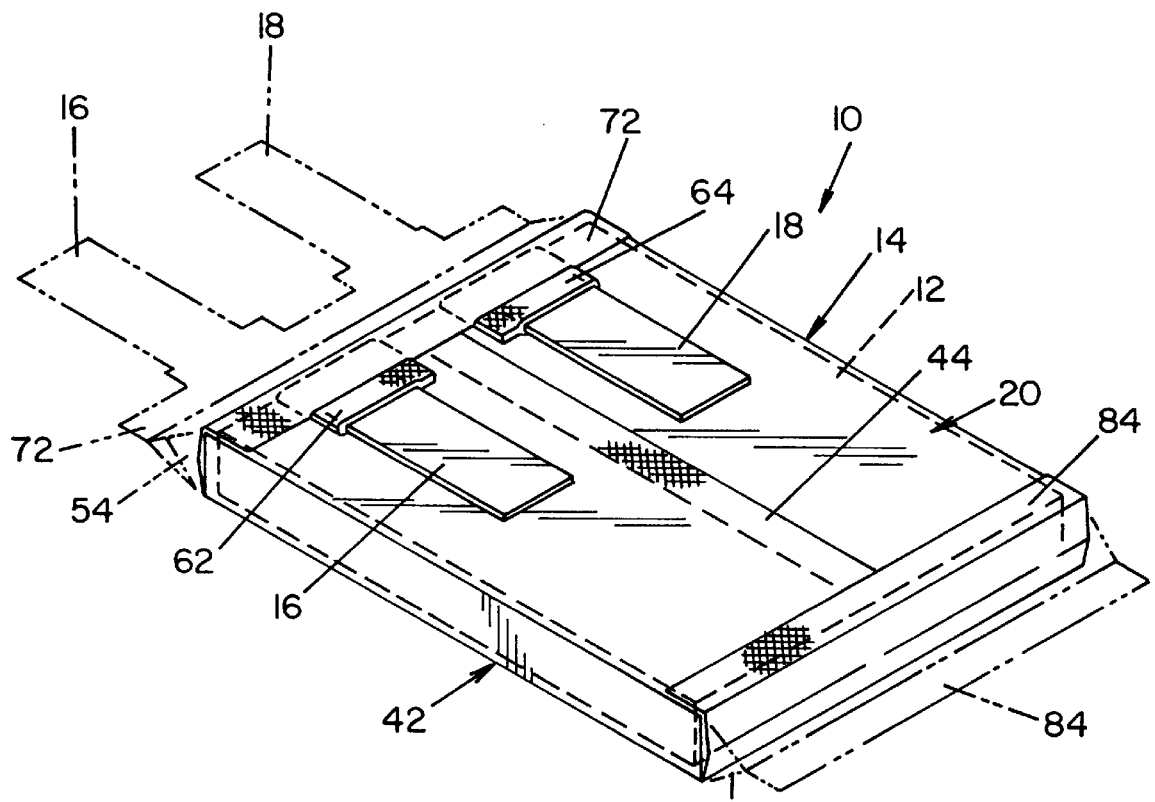
FIG. 21 is an enlarged perspective view showing the sealed portions of the battery package being wrapped onto the upper surface of the battery package.

As a final (optional) forming step, sealed seams 72, 84 of package 14 are folded up onto the surface of battery package 14. As best seen in FIGS. 7 and 21, sleeve 42 is oriented and positioned on cell 12 such that axial seam 44 is disposed between leads 16, 18 to provide a flat profile. The present invention thus provides a compact package 14 for a battery 10 that maximizes the energy density of the packaged battery as compared to conventional packages where seals are formed along three or four edges of the battery package.

Figure 22:
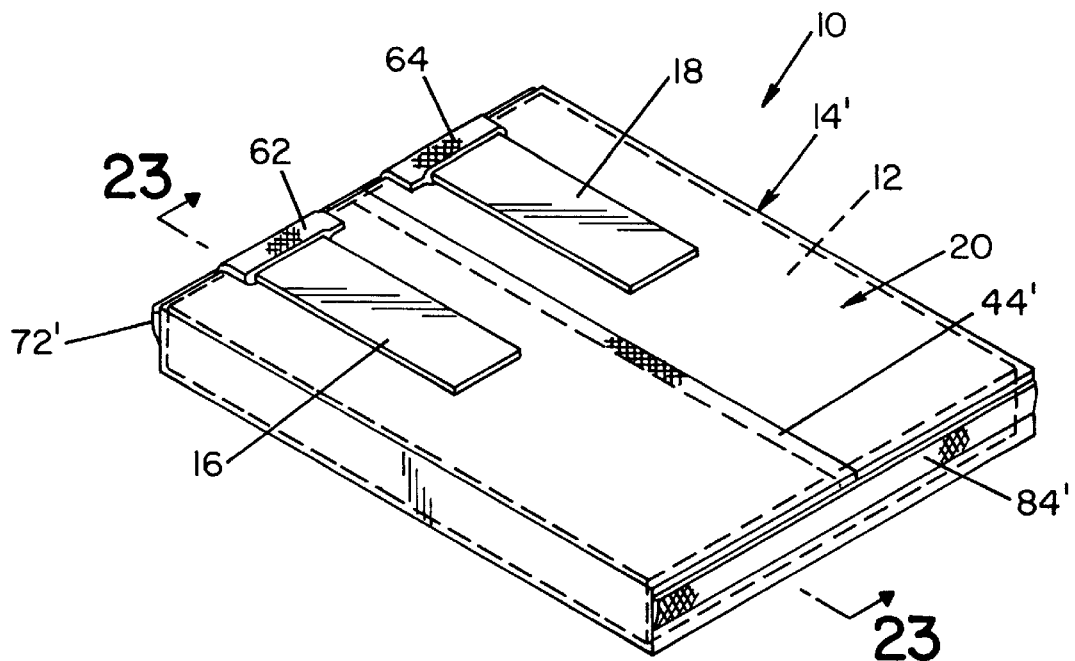
FIG. 22 is perspective view of a battery package illustrating an alternate embodiment of the present invention.
Figure 23:
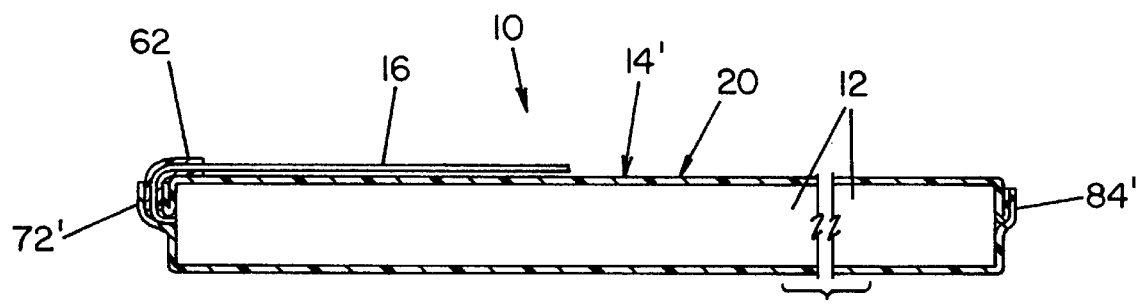
FIG. 23 is an enlarged cross-sectional view taken along the lines 23—23 of FIG. 22.

Preferably, seams 72, 84 forming battery package 14 are made to be as small as possible to achieve the desired degree of hermeticity. In this respect, package 14 shown in FIGS. 6–21 shows seams 44, 72 and 84 that are dimensioned solely for the purpose of illustration. Smaller seams may be achieved based upon the type of laminate material used in forming package 14, as well as the material forming laminate 20 itself. In this respect, FIGS. 22 and 23 illustrate a battery package 14' similar to that heretofore described in FIGS. 6–21, but showing thinner seams 44', 72' and 84' to illustrate a more compact battery package that may be attained.

Battery package 14 disclosed herein has been described with respect to a preferred laminate 20. It will, of course, be appreciated that other laminates incorporating other types of materials may be formed and be used in forming battery package 10 in accordance with a disclosed method of the present invention. Further, it will also be appreciated that although cell 12 disclosed in the present invention is rectangular, the present invention has equal application to polymorphic and cylindrical or circular types of batteries. It will further be appreciated that all batteries may not produce gases or vapors that need to be evacuated. In this respect, sleeve 42 may be dimensioned without pouch 76 and have a sealed seam formed immediately adjacent cell 12.

The foregoing is a description of specific embodiments of the present invention. It should be appreciated that these embodiments are described for purposes of illustration only, and that numerous alterations and modifications may be practiced by those skilled in the art without departing from the spirit and scope of the invention. For example, the basic procedure of forming a sleeve and fitting the battery into it may be applied to non-rectangular shapes; the longitudinal seal may be formed continuously from strip stock; the lateral seals may be formed without infolds or gussets; the battery feedthroughs may be at opposite ends of the package or on adjacent sides; gas may be removed from the package prior to formation of the final lateral seal by application of a pressure pad to the battery section. It is intended that all such modifications and alterations be included insofar as they come within the scope of the invention as claimed or the equivalents thereof.

Having described the invention, the following is claimed:

1. A method of packaging a battery, comprising the steps of:

forming a sleeve from a flat, rectangular sheet of a flexible laminate material by overlapping opposite edges of said sheet, said laminate comprised of a layer of a polymeric material, a layer of metal foil, and outer layers of an adhesive-like, thermoplastic polymer material;

applying sufficient heat to said overlapped edges to melt said adhesive-like polymer layers and form a continuous hermetically sealed axial seam extending the length of said sleeve;

inserting a battery into one end of said sleeve, said battery having two electronic leads extending from one side thereof and said battery being positioned within said sleeve wherein a portion of said leads is within said sleeve and a portion of said leads is outside said sleeve;

applying sufficient heat and pressure to the ends of said sleeve to melt said adhesive-like polymer layers to form sealed seams along the ends of said sleeve hermetically sealing the interior of said sleeve, one end of said sleeve forming a first sealed lateral seam about said electrical leads and the other end of said sleeve forming a second sealed lateral seam defining a cavity within said sleeve adjacent said battery;

evacuating the interior of said sleeve;

applying sufficient heat to said sleeve at a location immediately adjacent to the end of said battery to melt said adhesive layer to form a hermetically sealed third lateral seam along the end of said battery; and severing the portion of said sleeve beyond said third lateral seam seal.

2. A method as defined in claim 1, further comprising folding said first and third lateral seams onto the surface of the package of said battery.

3. A method as defined in claim 1, wherein said battery has a thin, rectangular shape.

4. A method as defined in claim 1, wherein said battery has a contoured shape.

5. A method as defined in claim 1, wherein said adhesive-like, thermoplastic polymer is selected from the group consisting of acrylics, ethylene acrylic acid (EAA) copolymers, EEA copolymer, ethylene methacrylic acid (EMA) copolymers, ethylene vinyl acetate (EVA) copolymers, polymethyl acrylate (PMA) acrylonitrite, vinyl chloride polypropylene (VCPP) copolymers, acrylic nitrile-butadiene-styrene (ABS) copolymers, polyethylene (PE) and polypropylene (PP), and rubber modified compounds of the foregoing.

6. A method as defined in claim 1, wherein prior to the step of forming lateral seams, said extending ends of said sleeve are folded inward to form gussets at the end of said battery.

7. A method of packaging a thin, flat battery having two flat leads extending from one edge thereof, comprising the steps of:

forming a sleeve from a sheet of a flexible laminate material having outer layers of a thermoplastic, adhesive-like polymer material by joining overlapping opposite edges of said sheet and melt sealing the same to form a continuously sealed axial seam extending along the length of said sleeve;

inserting a thin, flat battery into one end of said sleeve, said battery having two flat electronic leads extending from one side thereof, said leads having bands of a thermosetting, polymer sealing material therearound and said battery being positioned within said sleeve wherein said leads extend from said sleeve and a portion of said bands is within said sleeve and a portion of said bands is outside said sleeve;

applying sufficient heat and pressure to the ends of said sleeve to form sealed lateral seams along the ends of said sleeve hermetically sealing the interior of said sleeve, one end of said sleeve forming a seal about said band and said electrical leads and the other end of said sleeve forming a seal adjacent said battery.

8. A method as defined in claim 7, wherein said battery is rectangular in shape.

9. A method as defined in claim 8, wherein prior to the step of applying sufficient heat and pressure to the ends of said sleeve, opposed edges of said sleeve are forced inward to form gussets at the end of said rectangular battery.

10. A method as defined in claim 9, wherein said ends of said sleeve are joined by applying heat and pressure to said sleeve, said heat softening said thermoplastic material and said pressure joining the softened thermoplastic material.

\* \* \* \* \*